June 5, 1923.

W. J. CULLEN ET AL 1,457,504

SOLDERING MACHINE

Filed March 20, 1919

INVENTORS
William J. Cullen, Walter L. Rutkowski

BY
H. N. Low
ATTORNEY

June 5, 1923.  
W. J. CULLEN ET AL.  
SOLDERING MACHINE  
Filed March 20, 1919  
1,457,504  
7 Sheets-Sheet 5

INVENTORS  
William J. Cullen, Walter L. Butkowski  
BY  
H N Low  
ATTORNEY

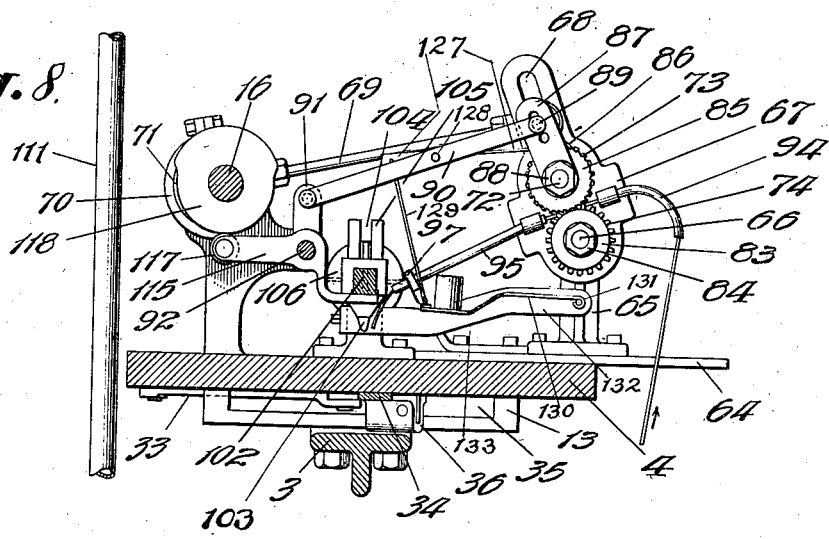

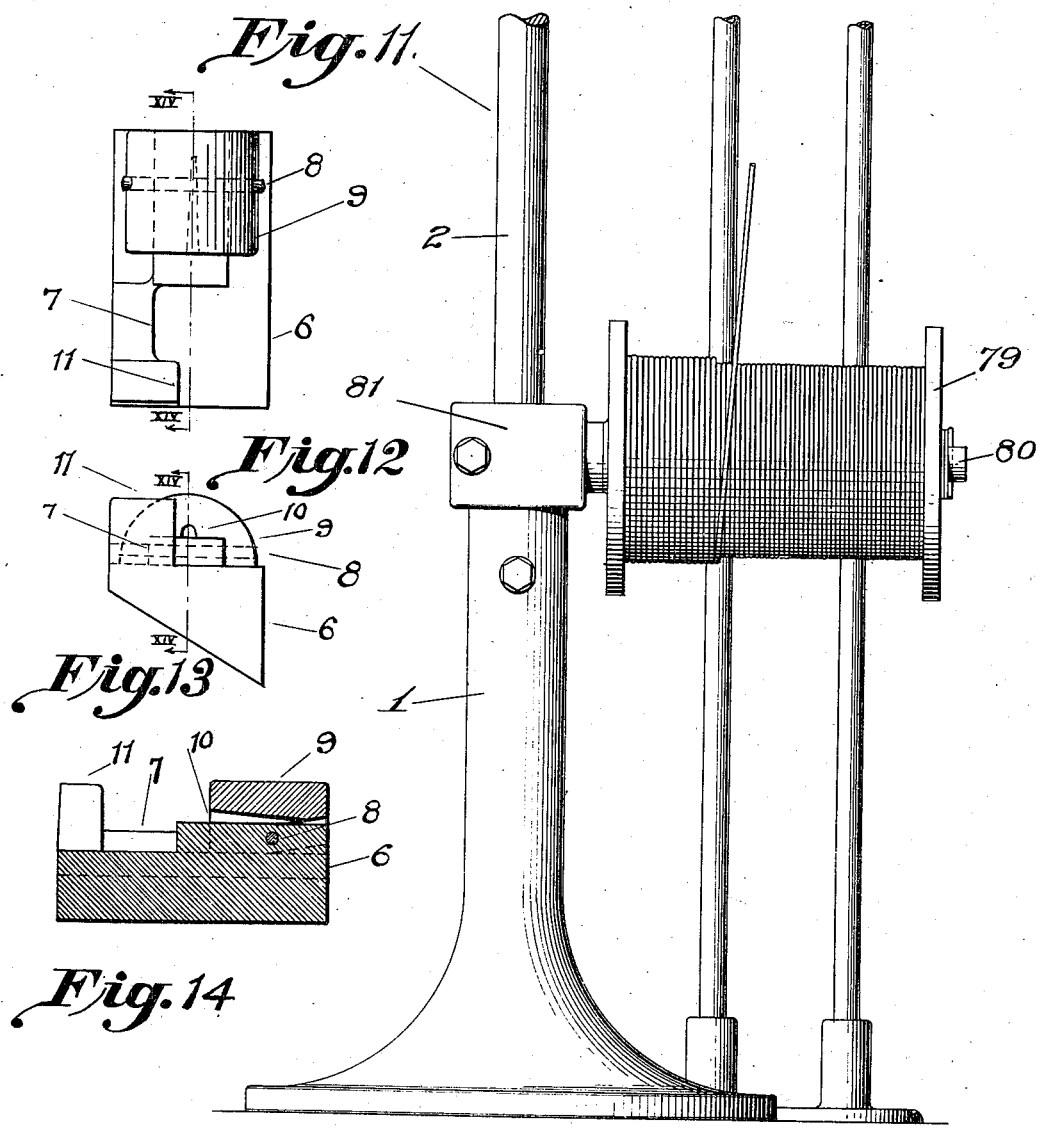

Patented June 5, 1923.

1,457,504

UNITED STATES PATENT OFFICE.

WILLIAM J. CULLEN AND WALTER L. RUTKOWSKI, OF ST. LOUIS, MISSOURI, ASSIGNORS TO AMERICAN CAN COMPANY, OF NEW YORK, N. Y., A CORPORATION OF NEW JERSEY.

SOLDERING MACHINE.

Application filed March 20, 1919. Serial No. 283,785.

*To all whom it may concern:*

Be it known that WILLIAM J. CULLEN and WALTER L. RUTKOWSKI, citizens of the United States, residing at the city of St. Louis, in the county of same and State of Missouri, have invented certain new and useful Improvements in Soldering Machines, of which the following is a specification.

The invention relates to automatic mechanism for soldering screw caps to the sides of spouts, or for performing a soldering operation on other articles for which the mechanism is adapted, and has for its objects to save hand labor, to perform the operation on successive articles at a relatively high speed so that the daily output is large in quantity with a minimum of labor, to use an unvariable minimum amount of solder, and to perform the operation accurately so that the finished articles are uniform for handling, boxing and use.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular construction which, for the purpose of explanation, have been made the subject of illustration. In the said drawings:—

Fig. 8 is a vertical section on line VIII—VIII of Figure 5, with the mechanism in solder-feeding position.

Fig. 9 is a similar view with the mechanism in a retarded non-solder-feeding position.

Fig. 10 is a vertical section on line X—X of Figure 4.

Fig. 11 is a front elevation of the lower part of the machine and solder supply.

Fig. 12 is an enlarged plan view of seat and clamp members for positioning caps and spouts while soldering.

Fig. 13 is a front end elevation of Fig. 12.

Fig. 14 is a sectional view on line XIV—XIV of Figures 12 and 13.

Figure 1:
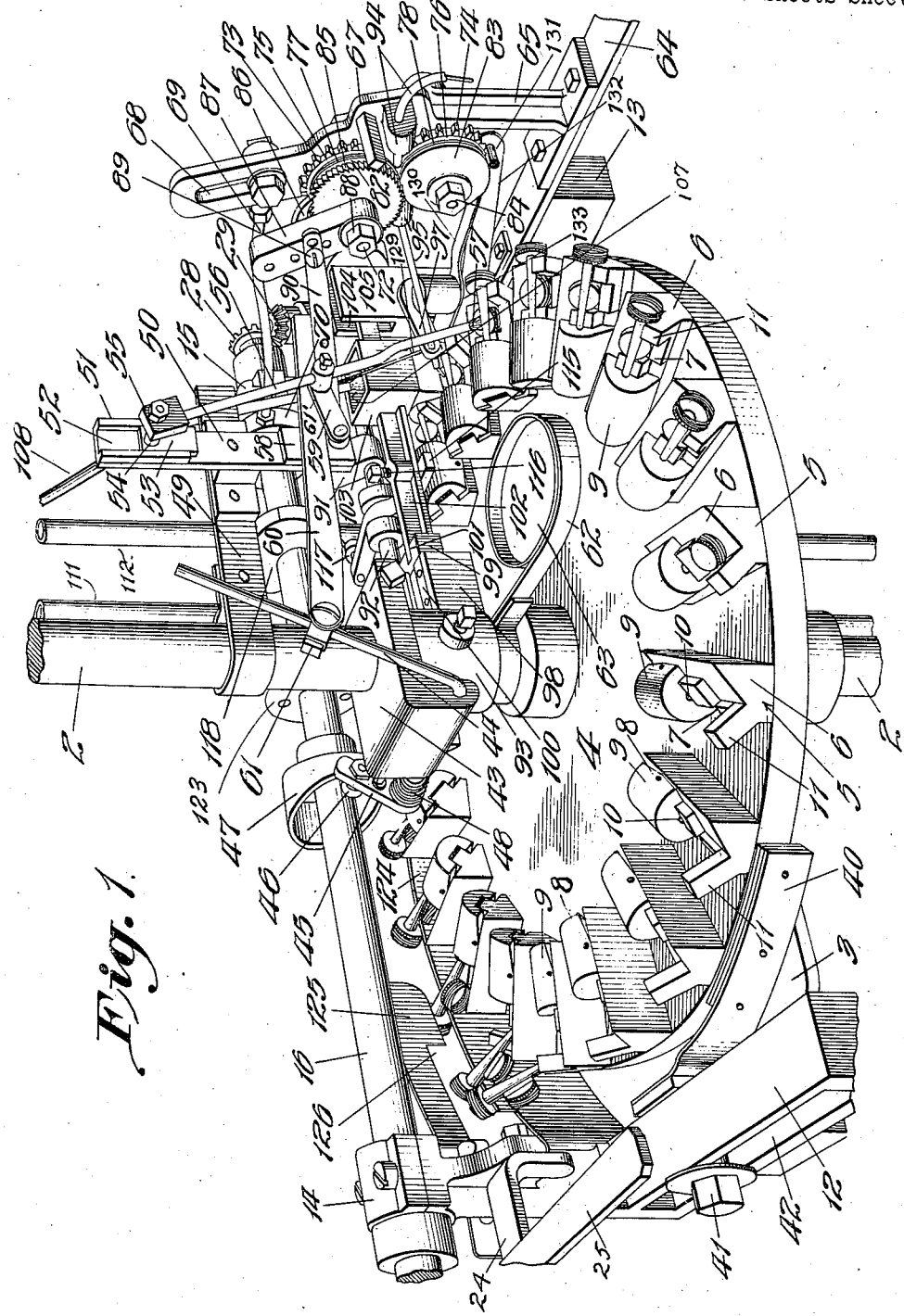
Fig. 1 is a perspective view of the main portion of the machine.
Figure 2:
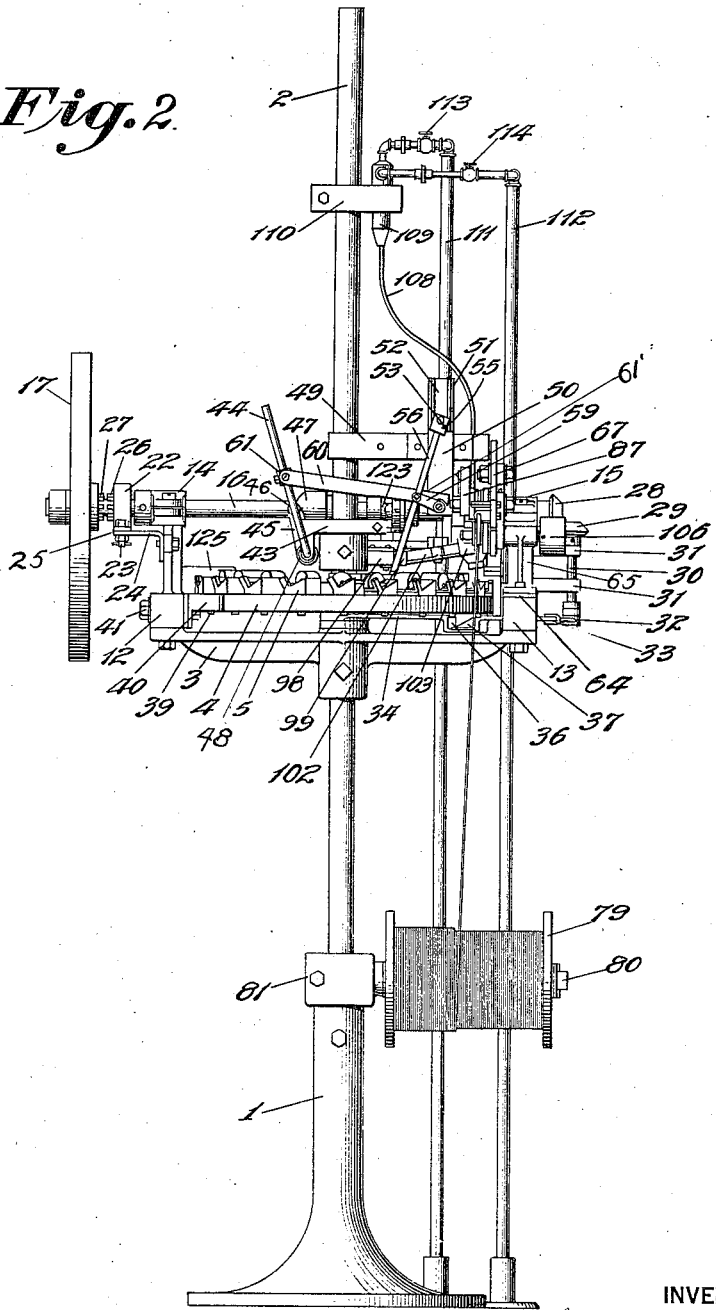
Fig. 2 is a front elevation of the entire machine on a smaller scale.
Figure 3:
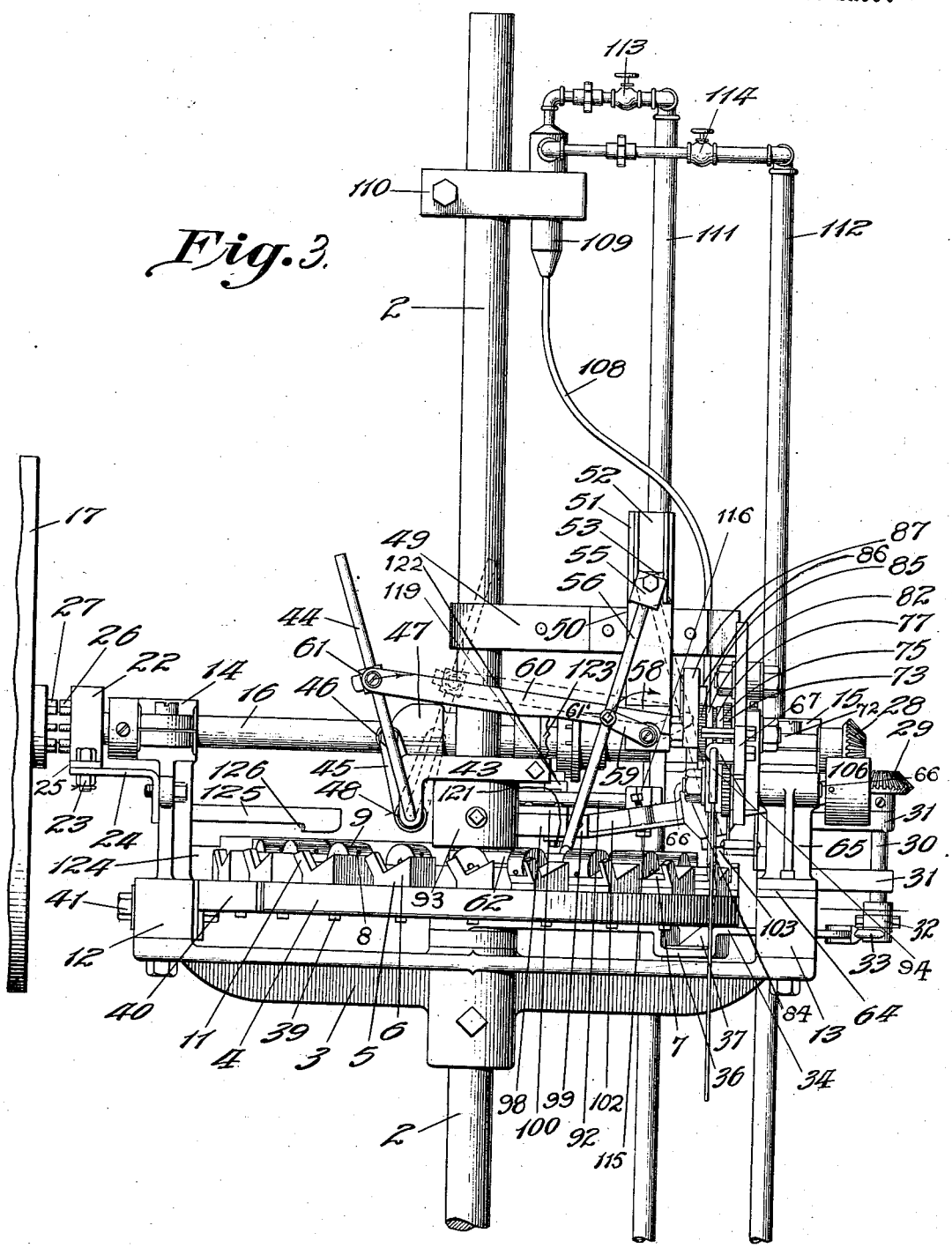
Fig. 3 is an elevation of the upper part of the machine from the same point of view as in Fig. 2, but on a larger scale.
Figure 4:
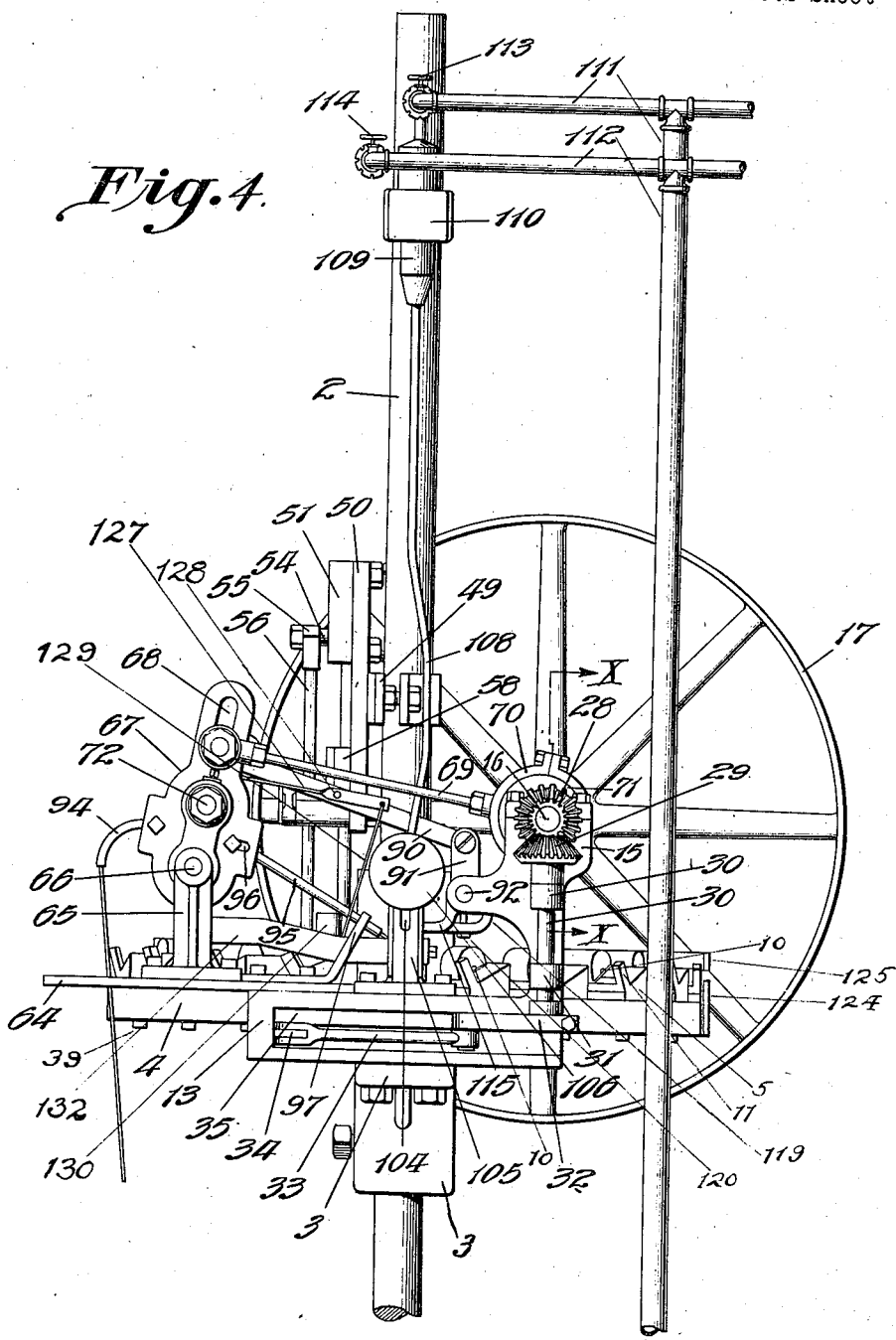
Fig. 4 is an elevation of the upper part of the machine viewed from the right hand of Fig. 3.
Figure 6:
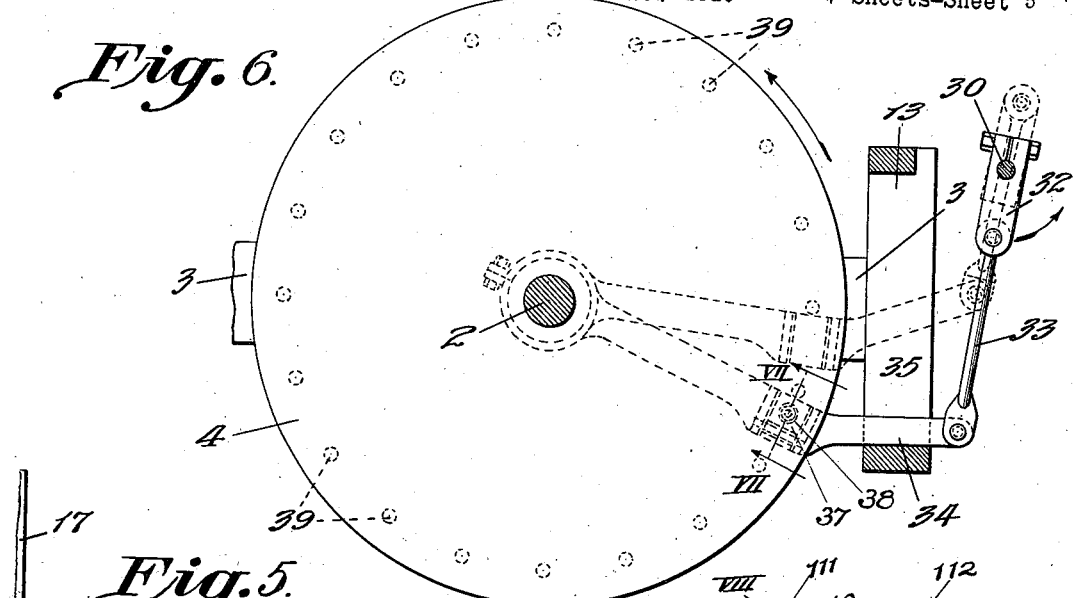
Fig. 6 is a plan view of the table and means for rotating the same, certain parts being shown in horizontal sections and other parts being removed.
Figure 5:
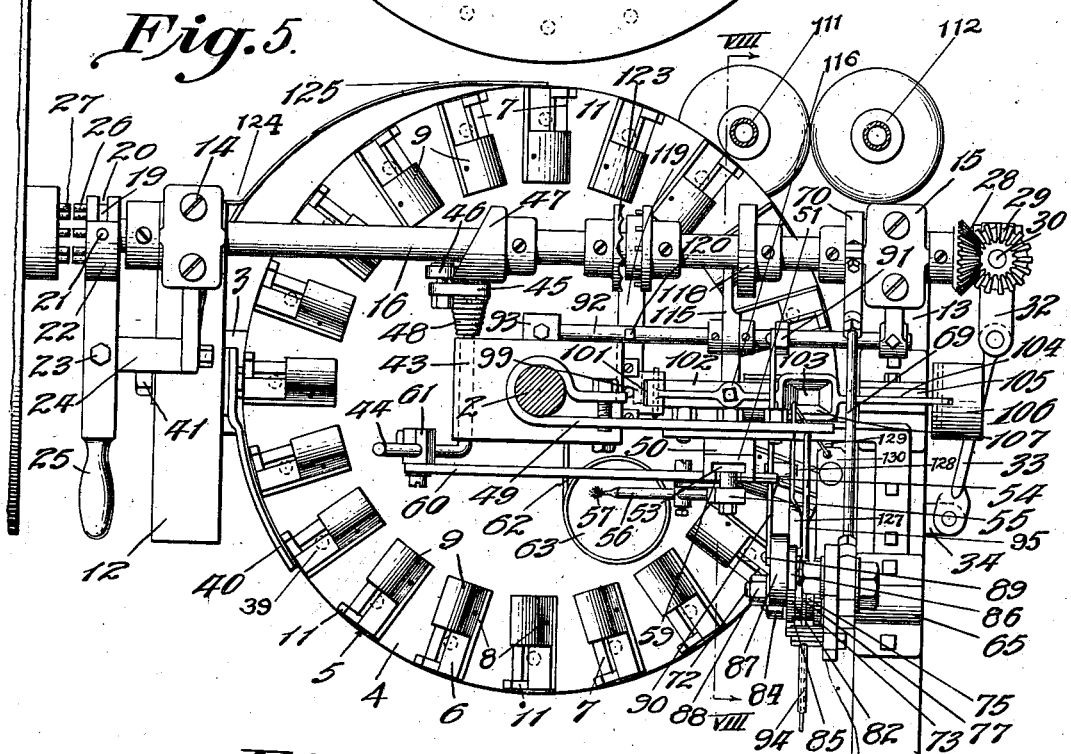
Fig. 5 is a plan view of the machine, with the central standard and piping shown in section.

Referring to the drawings:

1 indicates the main base of the machine, which supports a vertical stationary adjustable shaft or standard 2. Suitably secured to the shaft 2 is a bracket member 3 which supports a table 4 adapted to be intermittently rotated about the shaft 2.

The table 4 carries adjacent its periphery a plurality of cap seats and nozzle retaining members designated as a whole by the numeral 5. These seats are preferably formed of a base member 6 secured to the table and at an angle therewith so that when the seat with the cap and nozzle properly arranged thereon are in alignment with the soldering mechanism the line of contact between the nozzle and cap will be presented upwardly as nearly as possible to admit the access of the soldering iron. The caps are retained in position on the inclined base member 6 by a horizontal shoulder 7 against which the caps rest while being conveyed to the soldering station and during the soldering operation. Pivoted to the base member 6 as at 8 is a yieldable nozzle clamp or holder 9 provided with a longitudinal recess 10 formed and adapted to engage and retain a nozzle in horizontal position across the top of the cap and to which the nozzle is to be soldered. The clamping member 9 may be yieldably actuated by either a spring or by gravity. Adjacent to the retaining shoulder 7 and projecting upwardly at substantially right angles with the inclined base 6 is an abutment 11 adapted to co-act with the clamp 9 in retaining a nozzle in proper relation with the cap and to limit the inward movement of the nozzle within the clamp 9. The described arrangement of parts insure a proper and uniform positioning of the caps and nozzles relative to each other prior to permanently uniting the same by the soldering mechanism.

Fixed at each end of the bracket 3 are blocks 12 and 13 to which are secured bearing members 14 and 15 which rotatably support a horizontal drive shaft 16. Motive power is transmitted to the entire machine through the medium of a drive pulley 17 detachably secured to the drive shaft 16 by the following clutch mechanism. Slidably keyed to the shaft 16 by means of a feather key 18 is a collar 19 provided with a peripheral groove 20 adapted to receive pins 21 of a yoke member 22. The yoke 22 is pivoted as indicated at 23 to a bracket 24 secured to the bearing 14 and is provided with an operating handle 25. One face of the collar 19 is provided with a plurality of pins 26 which are adapted to be engaged by similar pins 27 projecting from the hub of the drive pulley 17. When it is desired to transmit power from the drive pulley 17 to the drive shaft 16 and its associated parts the collar 19 is shifted along the shaft 16 until the pins 26 are engaged by and mesh with the pins 27 of the rotating drive pulley 17 thus causing the drive pulley, clutch collar and drive shaft to rotate in unison.

Figure 7:
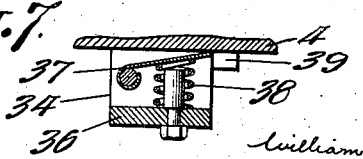
Fig. 7 is a detail sectional view enlarged, on line VII—VII of Figure 6.

An intermittent rotation is imparted to the table or bed 4 by means of the following described mechanism. Fixed to the drive shaft 16 is a beveled pinion 28 which meshes with and drives a similar beveled pinion 29 fixed to a comparatively short vertical shaft 30 supported by bracket members 31 secured to the block 13. The lower end of the shaft 30 is provided with a crank arm 32 which is connected by means of a connecting rod 33 with one end of an oscillating arm 34 mounted on the shaft 2 and beneath the table 4. The outer portion of this arm projects through a slot 35 in the block 13 and is supported therein. The arm 34 is provided with an offset portion 36 adjacent the outer periphery of the table 4 which constitutes a seat for a latch member 37 which is pivoted therein for vertical movement. The latch 37 is preferably in the form of a plate and is normally held in a raised position and in yieldable contact with the under face of the table 4 by means of a spring 38, Fig. 7. The under face of the table 4 is provided with a plurality of downwardly extending pins or studs 39 corresponding in number with the cap seats 5 and adapted to be engaged successively by the latch 37 upon each oscillation of the arm 34 thus imparting an intermittent or step by step rotation to the table 4. In order that the impetus occasioned by the actuation of the table by the arm 34 will not cause the table to ride past the desired point or more than one step there is provided a brake shoe 40 which is adjustably secured by means of a bolt 41, (Fig. 1), in a slot 42 in the block 12 and which constantly bears against the outer periphery of the table 4 thus furnishing the desired frictional resistance against the action of the arm 34 and insuring an accurate alignment of the cap seats 5 with the soldering mechanism presently to be described.

Secured to the shaft 2 is a bracket 43 in which is journalled an oscillating lever arm 44. To one end of the arm 44 is fixed a crank arm 45 which carries an anti-friction roller 46 adapted to engage a cam 47 fixed to the drive shaft 16. The arm and roller are held in contact with the cam 47 by a coiled spring 48 which encircles the portion of the lever arm 44 which extends out of the bracket 43 and which has each end respectively attached to the bracket 43 and the crank arm 45. Fixed to the shaft 2 above the bracket 43 is a horizontal bracket 49 which carries at its outer end a vertical plate 50. Secured to the upper end of the plate 50 is a guide 51 having a vertical recess 52 with under cut walls adapted to retain a vertically reciprocable slide block 53. The slide 53 is provided with a trunnion 54 to which is attached a block 55 which carries a downwardly extending brush rod 56 provided at its lower end with a brush 57. The plate 50 has fixed thereto at its lower extremity a block 58 to which it attached a crank arm 59. The crank arm 59 is operatively connected with the lever arm 44 by a link 60 and a swivel 61 and carries a swivel block 61 through which the brush rod 56 passes thus forming an operative connection therewith. Fixed to the shaft 2 is a bracket 62 which supports a flux pan 63 in the path of the brush 57 and into which the same is intermittently dipped with each oscillation of the brush and rod.

Secured to the upper face of the block 13 is a plate 64 which forms a support for a bracket 65. Journalled in the bracket 65 is a stud shaft 66, (Figs. 4-8-9) which carries a frame 67 adapted to be rocked upon the said shaft and which is provided with a slot 68 in its upper portion. The frame 67 is rocked upon the shaft 66 by a connecting rod 69 which is adjustably attached in the slot 68 and is connected at its other end with an eccentric strap 70 riding upon an eccentric 71 fixed to the drive shaft 16. Mounted in the frame 67 is a rotatable shaft 72 to which is fixed a spur gear 73 which meshes with a spur gear 74 keyed to the shaft 66. Spaced from the faces of the gears 73 and 74 by washers or space plates 75 and 76 and keyed to the shafts 66 and 72 respectively are two co-acting solder feed disks 77 and 78 provided with serrated peripheries and adapted to grip and feed solder in wire form to the soldering mechanism. The solder is supplied in wire form from a reel 79 (Fig. 11) mounted to rotate freely upon a shaft 80 fixed to a box 81 supported by the base 1 of the machine. Against the faces of the solder feed disks 77 and 78 is another set of space plates 82 and 83 respectively. The plate 83 is held from displacement and against the gear 74 by a nut 84. Keyed to the shaft 72 and adjacent to the plate 82 is a ratchet wheel 85 adapted to be engaged by a pawl 86 pivoted to an arm 87 mounted freely upon the shaft 72 and held thereon by a nut 88. The arm has adjustably secured thereto as at 89 one end of a rod 90 which is pivoted to a stationary bracket 91 fixed to a horizontal stationary shaft or rod 92 supported at each end respectively by the bracket 15 and a collar 93 fixed to the vertical shaft 2 of the machine.

The solder is supported on the frame 67 and in proper alignment with the feed disks 77 and 78 by tubular guide members 94 and 95 which are fixed to the frame in any preferred manner. The upper end of the guide 95 is yieldably supported upon the frame 67 in a slot 96, (Fig. 4), which permits the free movement of the said frame. The lower end of the guide 95 adjacent the soldering station is supported by a bracket 97 secured to the plate 64.

This arrangement of parts results in that when the frame 67 is rocked to the left (Fig. 8) and about its supporting shaft 66 under the action of the eccentric 71 and connecting rod 69, it carries the shaft 72, spur gear 73, solder feed disk 77, ratchet wheel 85 and arm 87 bodily in an arc concentric with said supporting shaft 66. The arm 87 being free upon the shaft 72 also swings about its pivotal connection 89 the same being substantially stationary owing to the relatively small arc traversed by the frame 67 during its oscillation. This results in that the pawl 86 engages the teeth of the ratchet wheel 85 which is keyed to the shaft 72 and holds the same stationary with respect to the arm 87. The upper solder feed disk 77 and spur gear 73 being also keyed to the shaft 72 are held stationary relative to the arm 87. The effect of this is to cause the shaft 72 and parts keyed thereto to rotate with respect to and independent of any movement of the frame 67. This causes the upper spur gear 73 to rotate the lower spur gear 74, which is keyed to the frame supporting shaft 66, independently of the movement of the frame 67 about the shaft 66 and causes the rotation of the lower solder feed disk 78 which is also keyed to the shaft 66. The intermittent rotation of the two solder feed disks 77 and 78 causes a step by step feed of the solder in the guides 94 and 95 supported by the frame 67 in addition to and independent of the said frame. When the frame 67 rocks back to its initial position, shown in (Fig. 9), the pawl 86 disengages itself from the ratchet wheel 85 allowing the solder feed disks to rotate freely and to roll upon the solder back to the point where they will again be actuated to feed more solder to the soldering station.

If for any reason the operator does not insert a cap and spout in any one of the retaining devices as it passes: it is desirable to prevent solder from being fed forward for that particular station by solder feed disks 77 and 78. This is accomplished by lever 127 preventing pawl 86 from engaging ratchet 85 as frame 67 is rocked forward. The free end of lever 127 is located under and normally contacts with pawl 86, is pivoted at 128 on a stud secured into side of rod 90, the upper end of a connecting rod 129 is hooked into end of lever 127, its lower end is secured to a plate 130, which is hinged at 131 on the end of a fixed arm 132 which is secured to bracket 105. This plate is formed so as to be weighted at one end and to be unevenly balanced and to gravitate.

If there is a spout in position in retaining device 5 when moving into soldering position, the large screwed portion of the spout will pass under and lift the offset portion 133 of the plate 130 thus causing the free end of lever 127 to be depressed away from pawl 86 allowing it to function properly. If spout is absent when moving into soldering position plate 130 will not be lifted and lever 127 will prevent pawl 86 from engaging ratchet 85.

The collar 93 has projecting therefrom a bracket 98 recessed to receive a slide 99 which is retained therein by overhanging plates 100. The slide 99 is bifurcated at one end as at 101 for a pivotal connection with one end of a solder iron arm 102 which carries at substantially its middle a solder iron 103. The free end of the solder iron arm operates in a vertical slot 104 in a bracket 105 secured to the block 13 and is provided with a weight 106 at its outer end to normally tend to hold the arm and soldering iron in soldering position. The soldering iron 103 is constructed with a hollow head forming a flame chamber 107 into which projects a pipe 108 which furnishes a jet of flame for heating the soldering iron 103. Fuel is supplied to the pipe 108 from a mixing chamber 109 secured to the shaft 2 by a bracket 110. Air and gas are admitted in proper proportions to the chamber 109 from pipes 111 and 112 and the flow thereof regulated by valves 113 and 114 respectively.

The solder iron is vertically actuated by a lever 115 mounted on the stationary shaft 92 one arm of which extends under the solder iron arm and engages a set screw 116 therein and the other arm carries an anti-friction roller 117 for engagement with a cam 118 fixed to the drive shaft 16. The solder iron is also reciprocated longitudinally to effect a proper distribution of the solder on the joint by means of a lever 119 (Figs. 5 and 10), pivotally mounted at 120 on the stationary shaft 92. One arm of the lever 119 is pivotally connected with the under side of the slide 99 as at 121 and the other arm is provided with an anti-friction roller 122 adapted to engage a pin cam 123 to cause a rapid lateral oscillatory movement of the lever 119.

When the soldered joint between the nozzle member and the screw cap has been completed the soldering iron 103 is raised by the continued rotation of the cam 118 and the completed cap and nozzle is intermittently carried around by the table to an arcuate fixed cam 124 eccentrically mounted with respect to the said table and adjacent the periphery thereof which is engaged by the cap portion of the nozzle during its travel and gradually withdraws the same from the clamps 9, (Fig. 1). As the intermittent rotation of the table continues and before the cap and nozzle is completely withdrawn from the clamp it engages beneath a second cam 125 superposed above the cam 124 which assists in completely removing the nozzle from the clamps. The cam 125 is recessed as at 126 to allow the joined cap and nozzle to fall to a suitable place of deposit.

What is claimed is:

1. In a soldering machine, the combination of an intermittently movable carrier, an endless series of seats and retaining members arranged along said carrier for holding pairs of separate articles in contact with each other to be soldered together, said seats being arranged to permit both of said articles to gravitate one above the other and to arrest the same when in alined position, and means for feeding solder intermittently to the joint between the articles of said pairs after they are positioned on said seats and as they are presented by the movement of said carrier.

2. In a soldering machine, the combination of an intermittently movable carrier, an endless series of inclined and shouldered seats and pivoted recessed retaining members arranged along said carrier for holding pairs of separate articles in contact with each other to be soldered together, said seats being arranged to permit both of said articles to gravitate one above the other and to arrest the same when in alined position, and soldering means adapted to operate on said pairs of articles as they are presented by the movement of said carrier.

3. In a soldering machine, the combination of an intermittently movable carrier, an endless series of inclined and shouldered seats and retaining members arranged along said carrier for holding pairs of separate articles in contact with each other to be soldered together, said seats being arranged to permit both of said articles to gravitate one above the other and to arrest the same when in alined position, and means for feeding solder intermittently to the joint between the articles of said pairs after they are positioned on said seats and as they are presented by the movement of said carrier.

4. In a soldering machine, the combination of an intermittently movable carrier, an endless series of seats and retaining members arranged along said carrier for holding relatively flat articles and cylindrical articles superposed thereon to be soldered together in pairs, said seats being arranged to permit both of said articles to gravitate one above the other and to arrest the same when in alined position, and means for feeding solder intermittently to the joint between the articles of said pairs after they are positioned on said seats and as they are presented by the movement of said carrier.

5. In a soldering machine, the combination of an intermittently movable carrier, an endless series of seats and retaining members arranged along said carrier for holding relatively wide articles and narrower articles superposed thereon to be soldered together in pairs, said seats being arranged to permit both of said articles to gravitate one above the other and to arrest the same when in alined position, and means for feeding solder intermittently to the joint between the articles of said pairs after they are positioned on said seats and as they are presented by the movement of said carrier.

6. In a soldering machine, the combination of an intermittently movable carrier rotary on an axis, an endless series of inclined and shouldered seats and radially recessed retaining members arranged along said carrier for holding relatively flat articles and cylindrical articles superposed thereon to be soldered together in pairs, said seats being arranged to permit both of said articles to gravitate one above the other and to arrest the same when in alined position, and soldering means adapted to operate on said pairs of articles as they are presented by the movement of said carrier, the said seats and recesses of the retaining members extending in horizontal directions and radially from the center of said carrier.

7. In a soldering machine, the combination of an intermittently movable carrier, seats arranged along said carrier for holding caps in position for soldering, nozzle retaining members co-operating with said seats to separately hold nozzles extending over and resting on said caps, said seats being arranged and inclined to permit said caps and nozzles both to gravitate, one superposed on the other, and to arrest the same in alined position, and soldering means adapted to operate on said caps and nozzles so relatively positioned as they are presented by the movement of said carrier.

8. In a soldering machine, the combination of a horizontal intermittently rotary carrier, seats spaced around said carrier for holding caps in position for soldering, nozzle retaining members co-operating with said seats to separately hold nozzles extending over and resting on said caps, said seats being arranged and inclined to permit said caps and nozzles both to gravitate, one superposed on the other, and to arrest the same in alined position, and soldering means adapted to operate on said caps and nozzles so relatively positioned as they are presented by the movement of said carrier.

9. In a soldering machine, the combination of an intermittently movable carrier, seats arranged along said carrier for holding caps in position for soldering, nozzle retaining members movable relative to and co-operating with said seats to separately hold nozzles extending over and resting on said caps, said seats being arranged and inclined to permit said caps and nozzles both to gravitate, one superposed on the other, and to arrest the same in alined position, and soldering means adapted to operate on said caps and nozzles so relatively positioned as they are presented by the movement of said carrier.

10. In a soldering machine, the combination of a horizontal intermittently movable carrier rotary on an axis, a series of cap seats arranged around the same having inclined cap-supporting faces and a radial cap-retaining shoulder, movable nozzle holders arranged to maintain the nozzles in radial line above and resting on the retained caps, said seats being arranged and inclined to permit said caps and nozzles both to gravitate, one superposed on the other, and to arrest the same in alined position, and soldering means adapted to operate on said caps and nozzles as they are presented by the movement of said carrier.

11. In a soldering machine, the combination of a horizontal intermittently movable carrier rotary on an axis, a series of cap seats arranged around the same having inclined cap-supporting faces and a radial cap retaining shoulder, movable radially recessed nozzle holders arranged to maintain the nozzles in radial line above and resting on the retained caps, said seats being arranged and inclined to permit said caps and nozzles both to gravitate, one superposed on the other, and to arrest the same in alined position, and soldering means adapted to operate on said caps and nozzles as they are presented by the movement of said carrier.

12. In a soldering machine, the combination of a horizontal intermittently movable carrier rotary on an axis, a series of cap seats arranged around the same having inclined cap-supporting faces and a radial cap-retaining shoulder and a nozzle-holding abutment, movable nozzle holders arranged to maintain the nozzles in radial line above and resting on the retained caps, said seats being arranged and inclined to permit said caps and nozzles both to gravitate, one superposed on the other, and to arrest the same in alined position, and soldering means adapted to operate on said caps and nozzles as they are presented by the movement of said carrier.

13. In a soldering machine, the combination of an intermittent carrier, an endless series of spaced seats on said carrier having inclined and shouldered article holding faces, said seats causing a pair of articles to gravitate relative to the carrier and to be arrested in alined position, a soldering iron movable vertically and horizontally relative to articles on said seats as they are presented by the movement of the carrier, and mechanism for operating said carrier and soldering iron.

14. In a soldering machine, the combination of a work-holder, soldering mechanism comprising opposing solder-feeding rolls, means for advancing and retracting one of said rolls relative to the other roll and towards and from the place on said work-holder where the soldering is performed, means for turning said roll to feed the solder and for freeing the same to roll on the solder strip when said roll is retracted, and means for melting the solder after it is advanced.

15. In a soldering machine, the combination of a work-carrier adapted to present successively articles to be soldered to a soldering mechanism, and said soldering mechanism comprising opposing solder-feeding rolls, means for advancing and retracting one of said rolls relative to the other roll and towards and from the place on said carrier where the soldering is performed, means for turning said roll to feed the solder and for freeing the same to roll on the solder strip when said roll is retracted, and means for melting the solder after it is advanced.

16. In a soldering machine, the combination of a work-carrier adapted to present successively articles to be soldered to a soldering mechanism, and said soldering mechanism comprising opposing solder-feeding rolls, means for advancing and retracting one of said rolls relative to the other roll and towards and from the place on said carrier where the soldering is performed, a fixed support connected with said rolls to cause the turning of the same to feed the solder, said connection leaving the roll free to roll on the solder strip when said roll is retracted, and means for melting the solder after it is advanced.

17. In a soldering machine, the combination of an intermittently movable carrier, an endless series of article-holding means arranged along said carrier, and soldering means arranged to operate on a series of articles held by said holding means, said soldering means comprising a swinging arm, rotary solder-grasping opposing rolls co-operating with said arm, one of said rolls being carried by said arm and movable relative to the other roll, means for swinging said arm away from the solder supply and towards the place of soldering and then swinging said arm reversely, and means for causing the roll which is carried by the arm to be turned in directions opposite to the directions of swinging said arm.

18. In a soldering machine, the combination of an intermittently movable carrier, an endless series of article-holding means arranged along said carrier, and soldering means arranged to operate on a series of articles held by said holding means, said soldering means comprising a swinging arm, a rotary solder-grasping opposing rolls co-operating with said arm, one of said rolls being carried by said arm and movable relative to the other roll, means for swinging said arm away from the solder supply and towards the place of soldering and then swinging said arm reversely, means for causing the roll which is carried by the arm to be turned in directions opposite to the directions of swinging of said arm, and means for adjusting the extent of movement of said swinging arm.

19. In a soldering machine, the combination of an intermittently movable carrier, an endless series of article-holding means arranged along said carrier, and soldering means arranged to operate on a series of articles held by said holding means, said soldering means comprising a swinging arm, rotary solder-grasping opposing rolls co-operating with said arm, one of said rolls being carried by said arm and movable relative to the other roll, means for swinging said arm away from the solder supply and towards the place of soldering and then swinging said arm reversely, and a fixed support on the frame of the machine having means for causing the roll which is carried by the arm to be turned in directions opposite to the directions of swinging of said arm.

20. In a soldering machine, the combination of an intermittently rotatable carrier having an endless series of inclined article-holding devices, the inclination of said article holding devices causing the separate gravitation and arrest in alined position of the articles to be united, a flux pan, a flux applying brush swingable vertically and horizontally into said pan and thence into contact with articles on said holding devices, a solder feeding means, a soldering iron movable downwardly into the angle between two articles to be soldered together when they are presented by said holding devices and also movable horizontally, and mechanism for operating said carrier and brush and soldering iron.

21. In a soldering machine, the combination of a horizontal intermittently rotatable carrier having a vertical axis and an endless series of spaced article-holding means, means for applying flux to said articles, a soldering iron which is vertically movable and horizontally slidable to which iron the articles to be soldered are presented by said carrier, a solder-feeding means for advancing the solder to the place of soldering, a horizontal shaft arranged across said carrier, and devices actuated by said shaft for operating said flux-applying means and for moving the soldering iron vertically and horizontally and for operating said solder-feeding means.

22. In a soldering machine, a solder-strip feeding means comprising solder grasping rolls, a means for turning said rolls to advance the solder, and means for advancing and retracting one of said rolls, said feeding means being controlled by the presence or absence of an article to be soldered.

23. In a soldering machine for uniting nozzles to the tops of caps, the combination of a rotary carrier having a vertical axis, a series of seats arranged on said carrier around said axis and extending radially from the latter, said seats having means for inclosing the end of a nozzle to hold the same in horizontal position, a stop for arresting the nozzle when it has gravitated into said position, each of said seats having an inclined surface on which the caps may gravitate relative to the nozzle and a stop for arresting the cap when in alinement beneath the nozzle, so that the caps and nozzles may be separately and radially supplied to said seats and will respectively gravitate into the required position for union with each other, means for applying solder to said nozzles and caps, and means for rotating said carrier.

24. In a soldering machine, the combination of an endless carrier rotary on an axis, means for actuating the same, an endless series of retaining devices fixed on said carrier having recesses for holding the ends of articles, an endless series of seats for other articles to be soldered to the first mentioned articles, each of said seats having means for alining one of said articles with the other, and soldering means adapted to operate on the pairs of alined articles as they are presented by the movement of said carrier.

25. In a soldering machine, the combination of an endless carrier, means for actuating the same, an endless series of retaining devices fixed on said carrier and having recesses for holding the ends of nozzles, an endless series of inclined seats for caps to be soldered to the nozzles, each of said seats having means for arresting the caps when they are alined with the nozzles, and soldering means adapted to operate on the pairs of alined articles as they are presented by the movement of said carrier.

In testimony whereof we affix our signatures.

WILLIAM J. CULLEN.
WALTER L. RUTKOWSKI.